United States Patent
Sharma et al.

(10) Patent No.: US 11,797,451 B1
(45) Date of Patent: Oct. 24, 2023

(54) DYNAMIC MEMORY MANAGEMENT IN MIXED MODE CACHE AND SHARED MEMORY SYSTEMS

(71) Applicant: Meta Platforms Technologies, LLC, Menlo Park, CA (US)

(72) Inventors: Sridhar Gurumurthy Isukapalli Sharma, Palo Alto, CA (US); Valerio Catalano, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/502,967

(22) Filed: Oct. 15, 2021

(51) Int. Cl.
*G06F 12/084* (2016.01)
*G06F 12/02* (2006.01)
*G06F 15/78* (2006.01)
*G06F 12/1045* (2016.01)

(52) U.S. Cl.
CPC ........ *G06F 12/084* (2013.01); *G06F 12/0238* (2013.01); *G06F 12/1054* (2013.01); *G06F 12/1063* (2013.01); *G06F 15/7807* (2013.01)

(58) Field of Classification Search
CPC ............... G06F 12/0238; G06F 12/084; G06F 12/1054; G06F 12/1063; G06F 15/7807
See application file for complete search history.

(56) References Cited

U.S. PATENT DOCUMENTS

| | | | |
|---|---|---|---|
| 10,802,967 B1 * | 10/2020 | Ray | G06F 9/3816 |
| 10,963,392 B1 * | 3/2021 | Gupta | G06F 12/0888 |
| 2017/0371783 A1 * | 12/2017 | Le | G06F 12/0831 |
| 2017/0371786 A1 * | 12/2017 | Srinivasan | G06F 12/0846 |

OTHER PUBLICATIONS

"CS356 Unit 9: Virtual Memory & Address Translation," USC Viterbi School of Engineering, Dec. 2013, 53 pages, Retrieved from the Internet: URL: https://ee.usc.edu/~redekopp/cs356/slides/CS356Unit9_VM.pdf.

"Lecture 16: Cache Introduction," 2009, 18 pages, Retrieved from the Internet: URL: https://courses.cs.washington.edu/courses/cse378/09wi/lectures/lec16.pdf.

* cited by examiner

*Primary Examiner* — Aracelis Ruiz
(74) *Attorney, Agent, or Firm* — Shumaker & Sieffert, P.A.

(57) ABSTRACT

The disclosure is directed to techniques for dynamically managing memory in mixed mode cache and shared memory systems. For example, a system on a chip (SoC) comprises: a plurality of memories, including a first memory and a second memory, where each of the memories includes one or more cache lines; a first subsystem comprising a first compute element and the first memory; a second subsystem comprising a second compute element and the second memory; and a memory control unit of the SoC comprising processing circuitry and configured to: configure a shared memory with one or more cache lines of at least one of the plurality of memories; and flush, based on one or more tag control bits for the one or more cache lines of the shared memory, data from the shared memory to a backend storage separate from the SoC.

20 Claims, 12 Drawing Sheets

DYNAMIC MEMORY MANAGEMENT IN MIXED MODE CACHE AND SHARED MEMORY SYSTEMS

TECHNICAL FIELD

This disclosure generally relates to memory architecture and, in particular, to mechanisms for managing shared memory in mixed mode cache and shared memory systems.

BACKGROUND

Computing systems use volatile memory such as Static Random-Access Memory (SRAM) to store executable code and data while the system is in operation. SRAM is considered volatile because, although SRAM uses latching circuitry to store each data bit, the data stored in SRAM is lost when power is removed.

Computing systems may be implemented through one or more Systems-on-a-Chip (SoCs). SoCs may dedicate a portion of die area to SRAM. The on-die SRAM of SoCs may, in some examples, be used as a cache or as shared memory (SMEM), or shared between the cache and the shared memory. In some examples, there is a pool of on-die SRAM that can be dynamically configured as either SRAM or Cache.

An artificial reality system is one type of computer system that relies on volatile memories such as SRAM. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g., wirelessly or in tethered fashion) to a peripheral device that performs one or more artificial reality-related functions. The HMD and/or peripheral device may include one or more SoCs with a portion of die area dedicated to SRAM.

SUMMARY

In general, this disclosure is directed to techniques for dynamically managing shared memory in mixed mode cache and shared memory systems. A System-on-a-Chip (SoC) may have one or more subsystems with compute elements that incorporate on-die SRAM distributed as local memory. Depending on the application, on-die SRAM may be more optimally used as a cache than as shared memory. For example, a cache is amenable to applications that reuse data e.g., have high locality of reference. Alternatively, applications that have limited to no reuse of data (e.g., deep neural networks that use data for intermediate activations only once), an on-die SRAM configured as a shared memory is better than a cache. The memory in this case is used more as a scratch memory. In mixed mode cache and shared memory systems, the on-die SRAM may be reconfigured from shared memory to a cache (and vice-versa), or may switch its association with one compute element to another compute element of the SoC. When an on-die SRAM is reconfigured from a shared memory to a cache, or when the shared memory switches its association with one compute element to another compute element of an SoC, data in the shared memory needs to be flushed (e.g., written into a different memory hierarchy such as off-chip backend storage memory such as double data rate (DDR) memory). The techniques described herein describe mechanisms for flushing particular data in the shared memory in mixed mode cache and shared memory systems without needing to flush the entire shared memory. As one example, a tag random access memory (RAM) infrastructure available for cache memories is reused to keep track of clean and dirty locations in memory or locations in memory that have been modified. For cases in which there is a large "virtual" memory and portions of the virtual memory get paged into on-die SRAM, a DDR memory is used as a backing store for the "virtual" memory. This is copied (e.g., via direct memory access (DMA)) to on-die SRAM which acts as a shared memory. Whenever this memory gets updated, the corresponding dirty tag bits will be updated and the dirty tag bits are used when deciding what needs to be copied back to the backend storage memory. This reuses the tag RAM that is available since the on-die SRAM can be configured as either shared memory or cache. They are not used in shared memory mode which is wasteful as the tag RAM already exists on-die. Being selective of which data needs to be flushed when assigning a different virtual page to this on-die SRAM or when transitioning from SMEM mode to cache may improve power consumption and/or optimize the DDR bandwidth.

As one example, an SoC is configured to leverage the cache flushing mechanisms to flush data from the shared memory to a backend storage (e.g., DDR memory), using tag control bits stored in a tag RAM to track valid/invalid and clean/dirty cache lines allocated for the shared memory, without needing to write the entire contents of the shared memory into the backend storage. Moreover, when flushing the data from the shared memory to the backend storage, a hardware state machine of one or more processors of the SoC ("memory control unit") is configured to determine the corresponding physical memory address of the backend storage corresponding to a virtualized shared memory space of the shared memory. For example, the shared memory address space may be virtualized and is split into pages (e.g., fixed-length contiguous blocks of virtual memory) with each page mapped to a physical memory address of on-die SRAM or the backend storage. The memory control unit of the SoC may, as one example, generate an address lookup table (also referred to herein as a page address translation table) that stores a mapping of virtual memory addresses of the shared memory to corresponding physical memory addresses of the backend storage such that when flushing the shared memory, the memory control unit may determine, based on a lookup of the address lookup table, the physical memory address within the backend storage to store the data from the shared memory. Alternatively, or additionally, the memory control unit may store the virtual memory addresses of the shared memory in the tag RAM such that when flushing the shared memory, the microcontroller unit may use the virtual memory addresses in the tag RAM to determine an offset in the backend storage, and use the offset (e.g., by adding the offset to a base address of the backend storage) to determine the physical memory address within the memory (e.g., DDR) to store the data from the shared memory.

In one example, the techniques describe a system on a chip (SoC) comprising: a plurality of memories, including a first memory and a second memory, where each of the memories includes one or more cache lines; a first subsystem comprising a first compute element and the first memory; a second subsystem comprising a second compute element and the second memory; and a memory control unit of the SoC comprising processing circuitry and configured to: configure a shared memory with one or more cache lines of at least one of the plurality of memories; and flush, based on one or more tag control bits for the one or more cache lines of the shared memory, data from the shared memory to a backend storage separate from the SoC.

In another example, the techniques describe an artificial reality system comprising: a head mounted display (HMD) configured to output artificial reality content, the HMD including a system on a chip (SoC), wherein the SoC comprises: a plurality of memories, including a first memory and a second memory, where each of the memories includes one or more cache lines;

a first subsystem comprising a first compute element and the first memory; a second subsystem comprising a second compute element and the second memory; and a memory control unit of the SoC comprising processing circuitry and configured to: configure a shared memory with one or more cache lines of at least one of the plurality of memories; and flush, based on one or more tag control bits for the one or more cache lines of the shared memory, data from the shared memory to a backend storage separate from the SoC.

In another example, the techniques describe a method comprising: configuring a shared memory with one or more cache lines of at least one of a plurality of memories of a system on a chip (SoC), the plurality of memories including a first memory of a first subsystem and a second memory of a second subsystem; and flushing, based on one or more tag control bits for the one or more cache lines of the shared memory, data from the shared memory to a backend storage separate from the SoC.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
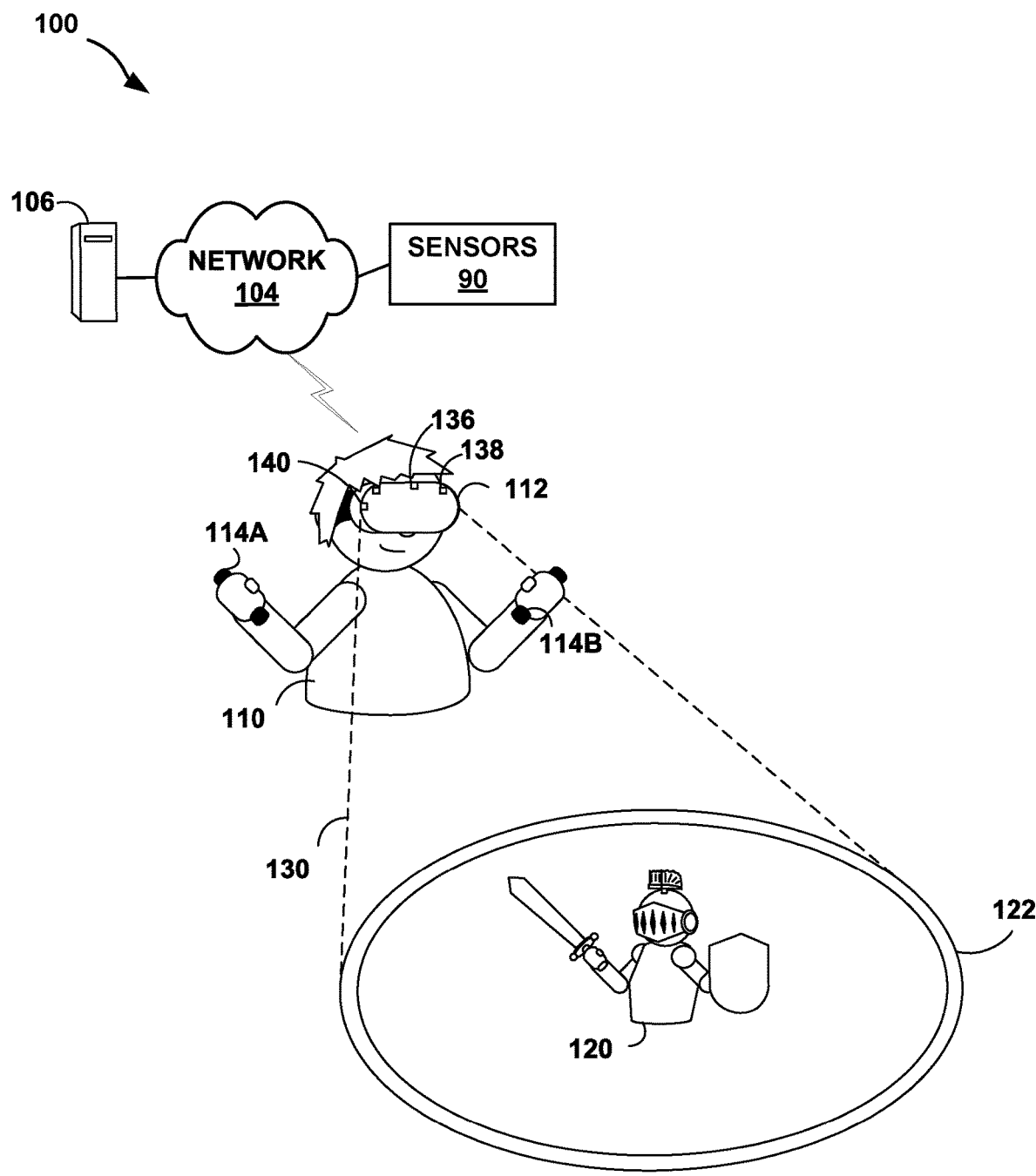
FIG. 1 is an illustration depicting an example artificial reality system that provides dynamic memory management in mixed mode cache and shared memory systems, in accordance with techniques described in this disclosure.

FIG. 1 is an illustration depicting an example artificial reality system that provides dynamic memory management in mixed mode cache and shared memory systems, in accordance with techniques described in this disclosure. The artificial reality system may be a virtual reality system, an augmented reality system, or a mixed reality system. In the example of FIG. 1, artificial reality system 100 includes a head mounted display (HMD) 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 as virtual objects 120 to user 110. In addition, HMD 112 includes an internal control unit 140 and one or more sensors 136 (e.g., accelerometers) for tracking motion of the HMD 112. In one example approach, internal control unit 140 includes one or more SoCs, each SoC including two or more compute elements and memory distributed among specific compute elements but accessible to other compute elements as detailed below. HMD 112 may further include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each of controller(s) 114 is an input device that user 110 may use to provide input to console 106, HMD 112, or another component of AR system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which, in some example, may be a presence-sensitive display. In some examples, controller(s) 114 may be a smartphone, tablet computer, personal data assistant (PDA), or other hand-held device. In some examples, controller(s) 114 may be a smartwatch, smart ring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by AR system 100.

In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile AR system, and AR system 100 may omit console 106.

In general, AR system 100 renders artificial reality content 122 for display to user 110 at HMD 112. In the example of FIG. 1, a user 110 views the artificial reality content 122 constructed and rendered by an artificial reality application executing on compute elements within HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects 120 to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112 and/or controllers 114, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

AR system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of a peripheral device, the hand, and/or the arm of the user 110, that are within field of view 130 along with virtual objects 120, such as within artificial reality content 122. In other examples, the artificial reality application may render virtual representations of the portions of a peripheral device, the hand, and/or the arm of the user 110 that are within field of view 130 (e.g., render real-world objects as virtual objects 120) within artificial reality content 122. In either example, user 110 is able to view the portions of their hand, arm, a peripheral device and/or any other real-world objects that are within field of view 130 within artificial reality content 122. In other examples, the artificial reality application may not render representations of the hand or arm of user 110.

To provide virtual content alone, or overlaid with real-world objects in a scene, HMD 112 may include a display system. For example, the display may include a projector and waveguide configured to translate the image output by the projector to a location viewable by a user's eye or eyes. The projector may include a display and a projector lens. The waveguide may include an input grating coupler to redirect light from the projector into the waveguide, and the waveguide may "trap" the light via total internal reflection (TIR). For example, the display may include arrays of red, green, and blue LEDs. In some examples, a color image may be formed by combination of the red, green, and blue light from each of the red, green, and blue LED arrays via a combiner. The waveguide may include an output grating to redirect light out of the waveguide, for example, towards an eye box. In some examples, the projector lens may collimate light from the display, e.g., the display may be located substantially at a focal point of the projector lens. The grating coupler may redirect the collimated light from the display into the waveguide, and the light may propagate within the waveguide via TIR at the surfaces of the waveguide. The waveguide may include an output structure, e.g., holes, bumps, dots, a holographic optical element (HOE), a diffractive optical element (DOE), etc., to redirect light from the waveguide to a user's eye, which focuses the collimated light from the display of the projector on the user's retina, thereby reconstructing the display image on the user's retina. In some examples, the TIR of the waveguide functions as a mirror and does not significantly affect the image quality of the display, e.g., the user's view of the display is equivalent to viewing the display in a mirror.

As further described herein, one or more devices of artificial reality system 100, such as HMD 112, controllers 114, and/or console 106, may include one or more SoCs. Further, one of more of the SoCs may comprise an SoC having one or more subsystems including compute elements and configured to share local memory between the compute elements. In some such SoCs, portions of the die area of an SoC are dedicated to SRAM and are distributed throughout the SoC as Local Memory (LMEM), located close to each compute element. On-die SRAM provide very large bandwidth, low latency and lower power memory solutions.

HMD 112, controllers 114, and/or console 106 may, in some examples, configure on-die SRAM as a cache or shared memory for an artificial reality application or workload, e.g., a teleconference application, a gaming application, a navigation application, an educational application, training or simulation applications, and the like. For example, an application may require 16 megabytes (MB) of memory. In this example, HMD 112, controllers 114 and/or console 106 may allocate a portion (e.g., 16 MB) of the memory (e.g., DDR) for the application. In some examples, a memory control unit may further apportion the memory for the application with on-die SRAM of the SoCs (e.g., 2 MB of the 16 MB) to increase performance. In these examples, on-die SRAM can be configured as a cache and/or as shared memory. In some examples, the on-die SRAM is used as a set-associative cache. A set-associative cache is a cache divided into one or more sets, where each set includes a particular number of cache lines (otherwise referred to as "ways"). For example, a set-associative cache may represent a 2 MB cache with 16-ways, each way being 128 kilobytes (KB). In some examples, the on-die SRAM is configured as a shared memory (SMEM). The shared memory system may enable compute elements of SoCs with concurrent and low-latency access to the shared memory, while also conserving power.

Depending on the application or workload, either a cache or shared memory may be more optimal. For example, a cache is more optimal for applications that reuse data (e.g., gaming application or tracking element). Alternatively, applications that have limited to no reuse of data (e.g., deep neural networks that use data for intermediate activations only once), a shared memory may be more optimal than a cache. However, because there is a duty cycle associated with the need to access the on-die SRAM configured as a shared memory, and if the shared memory is only to be used for a subset of the time, then on-die resources are wasted. In these examples, the on-die SRAM may need to transition between a cache and shared memory.

In some examples, the shared memory may need to switch its association with one compute element to another compute element. For example, HMD 112 may include a compute element for tracking functionality for an artificial reality application ("tracking compute element") and another compute element for machine learning functionality for the artificial reality application ("machine learning compute element"). At different times during the execution of the artificial reality application, the tracking compute element may need to use the shared memory for better performance, while at other times during the execution of the artificial reality application, the machine learning compute element may need to use of the shared memory for better performance.

When transitioning from a shared memory to a cache or switching the association of the shared memory with different compute elements, the entire contents of the shared memory are typically flushed to the backend storage irrespective of whether only certain cache lines have data that has not been propagated to memory (e.g., dirty cache lines). Flushing the entire contents of the shared memory for each transition is wasteful of resources, such as from a power and bandwidth standpoint.

In accordance with the techniques described in this disclosure, a hardware state machine of one or more processors of the SoCs ("memory control unit") may provide memory management for a shared memory when transitioning on-die SRAM between a shared memory and cache, or when switching associations with different compute elements.

To transition a portion of a set-associative cache to a shared memory, one or more cache lines are removed from the set-associative cache and allocated for the shared memory. For instance, to configure on-die SRAM as shared memory, the memory control unit may remove at least one of the 16-ways from the cache to be allocated for the shared memory. Ways that are transitioning from cache to shared memory need to be flushed and invalidated (e.g., unsetting valid bit) before use as shared memory. In general, a "way" of a cache includes a data block along with the valid and tag bits.

Once the data is flushed from the ways of the cache, the memory control unit may leverage the tag control bits stored in a tag RAM to manage the shared memory. For example, the memory control unit may use valid/invalid bits and clean/dirty bits to keep track of data in ways transitioned to the shared memory. For example, the memory control unit may set a valid bit for cache lines (e.g., way) allocated for the shared memory to indicate the cache lines of the shared memory has valid data. If data within the cache lines of the shared memory is modified and has not been propagated to memory, the memory control unit may set a dirty bit for the cache lines within the tag RAM. In this manner, when flushing the shared memory (e.g., due to transition from SMEM to cache or switching association of SMEM to another compute element), the memory control unit may propagate only the data in cache lines of the shared memory with a valid bit and dirty bit set to the backend storage (e.g., DDR).

In some examples, the shared memory address space is virtualized. For example, the virtual memory address space for the shared memory is split into pages, with each page pinned to on-die SRAM or backend storage. An address lookup table (otherwise referred to herein as "page address translation table") may be used to translate a virtual memory address of the shared memory to a physical memory address of the on-die SRAM or backend storage.

In these examples, when evicting the on-die SRAM configured as shared memory (e.g., due to transition from SMEM to cache or switching association of SMEM to another compute element), the memory control unit may determine the location within the backend store to store the data in the shared memory.

As one example (and as further described in FIGS. 7 and 8 below), the memory control unit may generate an address lookup table including a mapping of virtual memory addresses of the shared memory to physical memory addresses of the backend storage in memory. In some examples, the address lookup table is programmed with a mapping of a physical address to a virtual address that matches an offset in the backing storage. When evicting the shared memory, the memory control unit may use the physical memory address of the shared memory that is pinned to the on-die SRAM to determine a virtual memory address of the shared memory, which in turn is used to perform a reverse lookup of the address lookup table to determine a physical memory address of the backend store for which to store data from the shared memory.

In another example (and as further described in FIG. 9 below), the memory control unit may store the virtual memory addresses of the shared memory in the tag RAM. When evicting the shared memory, the memory control unit may perform a lookup and use the contents of the tag RAM to determine the virtual memory address, to determine an offset in the backend storage. The offset of the backend storage is then added to a base address of the backend storage to determine the physical memory address in the memory to store the data in the shared memory.

In this way, the SoC may leverage the cache flushing mechanisms for shared memory without needing to flush the entire contents of the shared memory and may determine the physical memory addresses within the backend storage to store the data in the shared memory when evicting the shared memory.

Figure 2A:
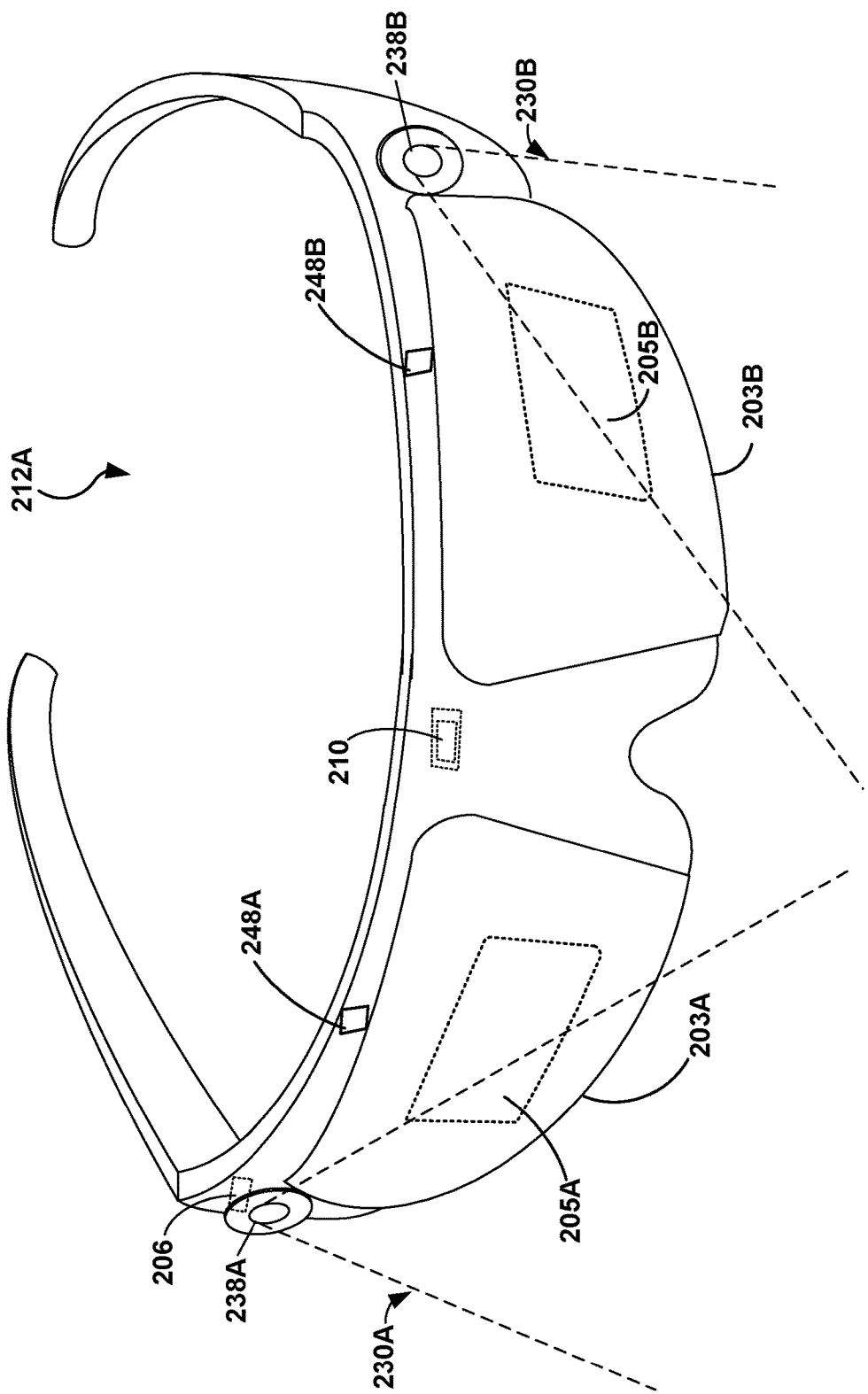
FIG. 2A is an illustration depicting an example HMD that provides dynamic memory management in mixed mode cache and shared memory systems, in accordance with techniques described in this disclosure.

FIG. 2A is an illustration depicting an example HMD providing dynamic memory management in mixed mode cache and shared memory systems, in accordance with techniques described in this disclosure. HMD 212A of FIG. 2A may be an example of HMD 112 of FIG. 1. As shown in FIG. 2A, HMD 212A may take the form of glasses. HMD 212A may be part of an artificial reality system, such as AR system 100 of FIG. 1, or may operate as a stand-alone, mobile artificial realty system configured to implement the techniques described herein.

In this example, HMD 212A are glasses comprising a front frame including a bridge to allow the HMD 212A to rest on a user's nose and temples (or "arms") that extend over the user's ears to secure HMD 212A to the user. In addition, HMD 212A of FIG. 2A includes one or more projectors 248A and 248B, one or more waveguides 203A and 203B (collectively, "waveguides 203") and one or more waveguide output structures 205A and 205B (collectively, "waveguide output structures 205") configured to redirect light out of the waveguides 203A and 203B. In the example shown, projectors 248A and 248B (collectively, "projectors 248") may input light, e.g., collimated light, into waveguides 203A and 203B via a grating coupler (not shown) that redirects light from the projectors 248 into waveguides 203 such that the light is "trapped" via total internal reflection (TIR) within the waveguide. For example, projectors 248A and 248B may include a display and a projector lens. In some examples, waveguides 203 may be transparent and alternatively may be referred to as "windows 203" hereinafter. In some examples, the known orientation and position of windows 203 relative to the front frame of HMD 212A is used as a frame of reference, also referred to as a local origin, when tracking the position and orientation of HMD 212A for rendering artificial reality content according to a current viewing perspective of HMD 212A and the user. In some examples, projectors 248 can provide a stereoscopic display for providing separate images to each eye of the user.

In the example shown, waveguide output structures 205 cover a portion of the windows 203, subtending a portion of the field of view 230 viewable by a user 110 through the windows 203. In other examples, the waveguide output structures 205 can cover other portions of the windows 203, or the entire area of the windows 203.

As further shown in FIG. 2A, in this example, HMD 212A further includes one or more motion sensors 206, one or more integrated image capture devices 238A and 238B (collectively, "image capture devices 238"), an internal control unit 210, which may include an internal power source and one or more printed-circuit boards having one or more processors, memory, and hardware to provide an operating environment for executing programmable operations to process sensed data and present artificial reality content on waveguide output structures 205. Internal control unit 210 may include an SoC in accordance with the present disclosure that receives information from one or more of sensor(s) 206, image capture devices 238, controller(s) such as controller(s) 114 as shown in FIG. 1, and/or other sensors, and that forms part of a computing system to process the sensed data and present artificial reality content on waveguide output structures 205 in accordance with the present disclosure. In one example approach, each SoC includes two or more compute elements and memory distributed among specific compute elements but accessible to other compute elements as detailed below.

Image capture devices 238A and 238B (collectively, "image capture devices 238") may include devices such as video cameras, laser scanners, Doppler radar scanners, depth scanners, or the like, configured to output image data representative of the physical environment. More specifically, image capture devices 238 capture image data representative of objects in the physical environment that are within a field of view 230A, 230B of image capture devices 238, which typically corresponds with the viewing perspective of HMD 212A.

In accordance with the techniques described in this disclosure, HMD 212A may include a memory control unit for dynamically managing memory in mixed mode cache and shared memory systems, as further described in FIGS. 5-11 below.

Figure 2B:
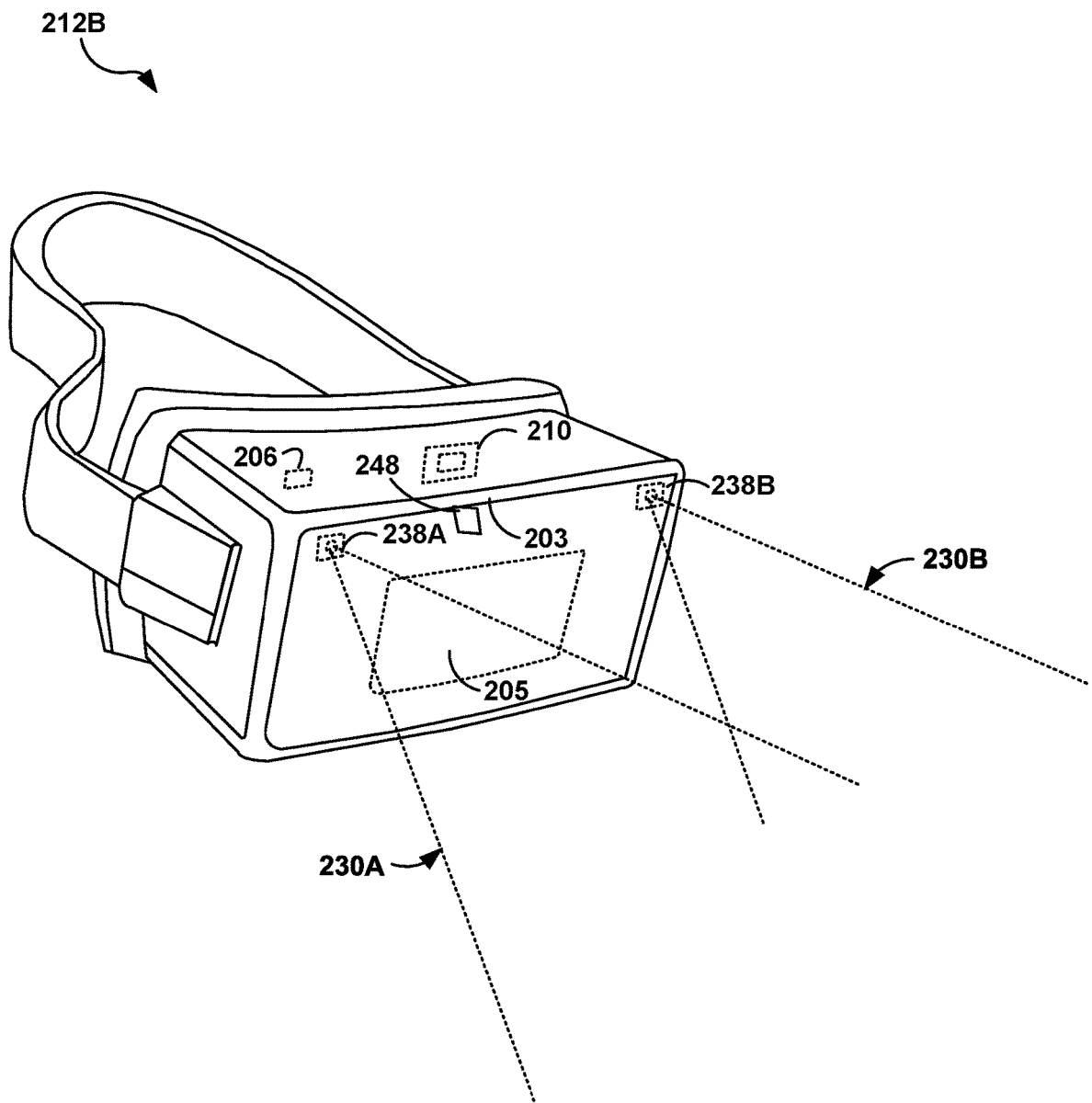
FIG. 2B is an illustration depicting another example HMD that provides dynamic memory management in mixed mode cache and shared memory systems, in accordance with techniques described in this disclosure.

FIG. 2B is an illustration depicting another example HMD that provides dynamic memory management in mixed mode cache and shared memory systems, in accordance with techniques described in this disclosure. HMD 212B may be part of an artificial reality system, such as artificial reality system 100 of FIG. 1, or may operate as a stand-alone, mobile artificial realty system configured to implement the techniques described herein.

In this example, HMD 212B includes a front rigid body and a band to secure HMD 212B to a user. In addition, HMD 212B includes a waveguide 203 (or, alternatively, a window 203) configured to present artificial reality content to the user via a waveguide output structure 205. In the example shown, projector 248 may input light, e.g., collimated light, into waveguide 203 via an input grating coupler (not shown) that redirects light from projector(s) 248 into waveguide 203 such that the light is "trapped" via total internal reflection (TIR) within waveguide 203. For example, projector 248 may include a display and a projector lens. In some examples, the known orientation and position of waveguide 203 relative to the front rigid body of HMD 212B is used as a frame of reference, also referred to as a local origin, when tracking the position and orientation of HMD 212B for rendering artificial reality content according to a current viewing perspective of HMD 212B and the user. In other examples, HMD 212B may take the form of other wearable head mounted displays, such as glasses or goggles.

Similar to HMD 212A of FIG. 2A, the example HMD 212B shown in FIG. 2B further includes one or more motion sensors 206, one or more integrated image capture devices 238A and 238B, an internal control unit 210, which may include an internal power source and one or more printed-circuit boards having one or more processors, memory, and hardware to provide an operating environment for executing programmable operations to process sensed data and present artificial reality content on waveguide output structure 205. Internal control unit 210 may include an SoC in accordance with the present disclosure that receives information from one or more of sensor(s) 206, image capture devices 238, controller(s) such as controller(s) 114 as shown in FIG. 1, and/or other sensors, and that forms part of a computing system to process the sensed data and present artificial reality content on waveguide output structures 205 in accordance with the present disclosure. In one example approach, each SoC includes two or more compute elements and memory distributed among specific compute elements but accessible to other compute elements as detailed below.

In accordance with the techniques described in this disclosure, HMD 212B may include a memory control unit for dynamically managing the memory in mixed mode cache and shared memory systems, as further described in FIGS. 5-11 below.

Figure 3:
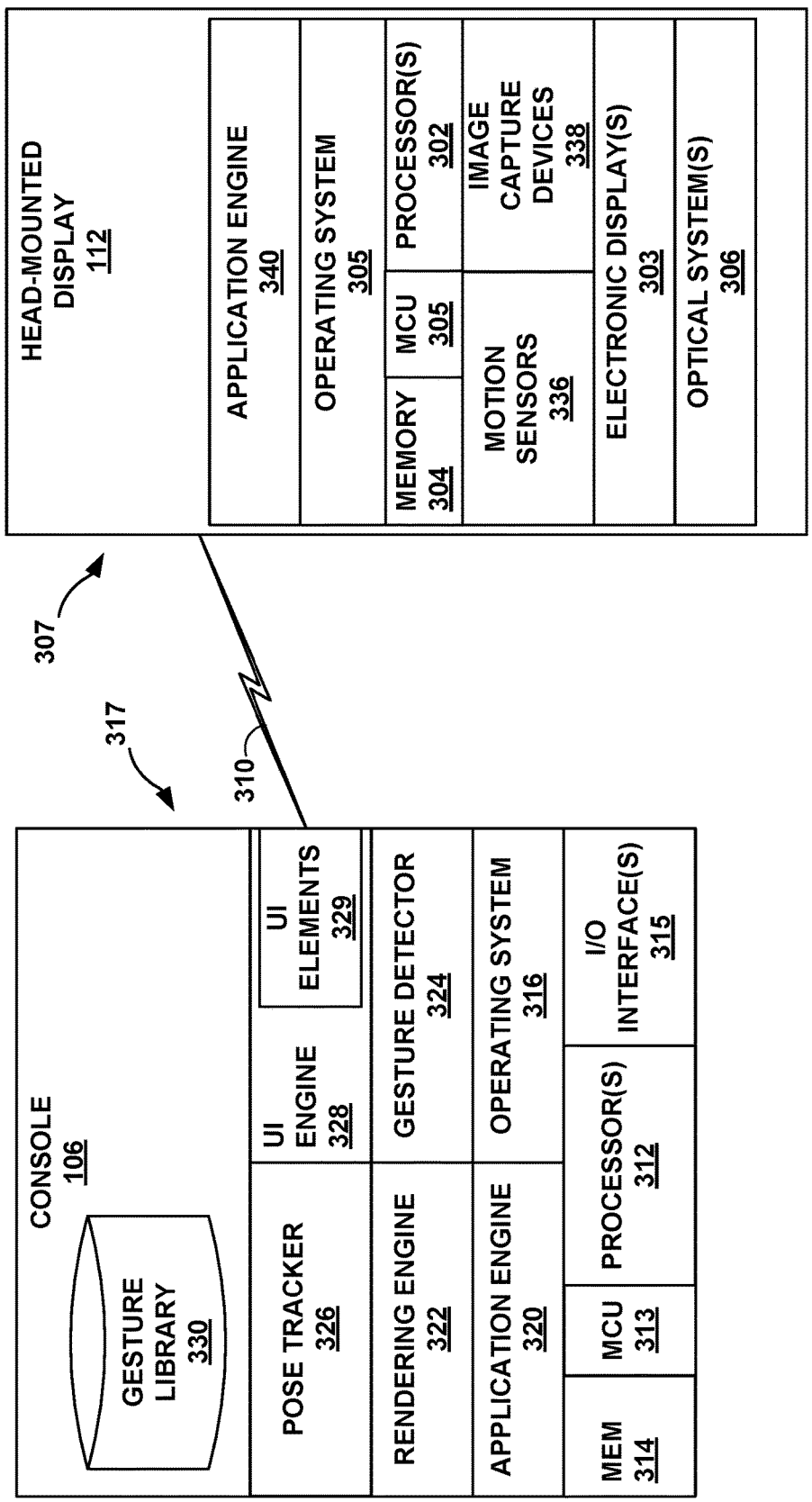
FIG. 3 is a block diagram showing example implementations of a console and an HMD of the artificial reality system of FIG. 1, in accordance with techniques described in this disclosure.

FIG. 3 is a block diagram showing example implementations of a console and an HMD of the artificial reality system of FIG. 1, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to one or more electronic displays 303, motion sensors 336, image capture devices 338, and, in some examples, optical system 306. Motion sensors 336 of FIG. 3 may be an example of motion sensors 206 of FIGS. 2A and 2B or of sensors 136 of FIG. 1. Image capture devices 338 of FIG. 3 may be an example of image capture devices 238 of FIGS. 2A and 2B or of image capture devices 138 of FIG. 1. In some examples, processors 302 and memory 304 may be separate, discrete components. In other examples, memory 304 may be on-chip memory collocated with processors 302 within a single integrated circuit such as an SoC. In some examples, functionality of processors 302 and/or memory 304 for processing data may be implemented as an SoC/SRAM integrated circuit component in accordance with the present disclosure, SRAM is distributed as local memory between the processors but is accessible to each of the processors via a local memory caching mechanism, as detailed below.

In some examples, optical system 306 may include projectors and waveguides for presenting virtual content to a user, as described above with respect to FIGS. 2A and 2B. For example, optical system 306 may include a projector including electronic display 303 and a projection lens.

In general, console 106 is a computing device that processes image and tracking information received from image capture devices 338 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to I/O interfaces 315, which include one or more I/O interfaces for communicating with external devices, such as a keyboard, game controller(s), display device(s), image capture device(s), HMD(s), peripheral device(s), and the like. Moreover, I/O interfaces 315 may include one or more wired or wireless network interface controllers (NICs) for communicating with a network, such as network 104. In some examples, functionality of processors 312 and/or memory 314 for processing data may be implemented as an SoC/SRAM integrated circuit component in accordance with the present disclosure.

Software components 317 of console 106 operate to provide an overall artificial reality application. In this example, software components 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel 310, to HMD 112 for display at HMD 112.

Based on the sensed data from any of the image capture devices 338, or other sensor devices (such as motion sensors 336), gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by motion sensors 336 and image capture devices 338 of HMD 112 and/or sensors 90 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

In accordance with the techniques described in this disclosure, HMD 112 may include a memory control unit 305 for dynamically managing memory in mixed mode cache and shared memory systems, as further described in FIGS. 5-11 below. In some examples, console 106 may include a memory control unit 313 for dynamically managing memory in mixed mode cache and shared memory systems, as further described in FIGS. 5-11 below.

Figure 4:
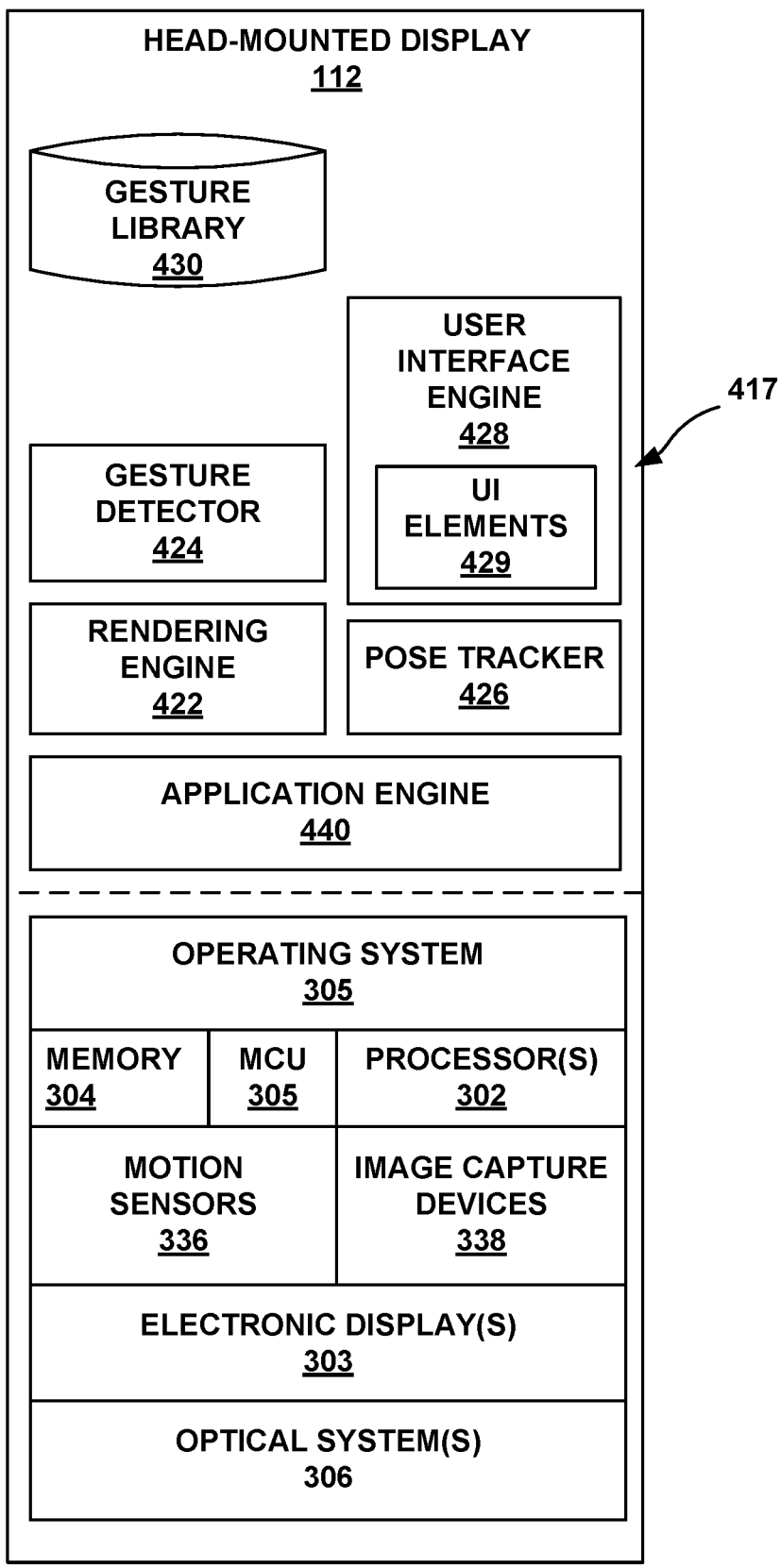
FIG. 4 is a block diagram depicting an example HMD of the artificial reality system of FIG. 1, in accordance with the techniques described in this disclosure.

FIG. 4 is a block diagram depicting an example HMD of the artificial reality system of FIG. 1, in accordance with the techniques described in this disclosure. In the example shown in FIG. 4, HMD 112 is a standalone artificial reality system. In this example, like FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display(s) 303, varifocal optical system(s) 306, motion sensors 336, and image capture devices 338. In some examples, functionality of processors 302 and/or memory 304 for processing data may be implemented as an SoC integrated circuit component in accordance with the present disclosure. In one such example approach, each SoC includes two or more compute elements and memory distributed as local memory among specific compute elements but accessible to each of the other compute elements via a local memory caching mechanism, as detailed below.

In some examples, optical system 306 may include projectors and waveguides for presenting virtual content to a user, as described above with respect to FIGS. 2A-2B. For example, optical system 306 may include a projector including electronic display 303 and a projection lens. The projection lens may further include a multi-functional DOE that functions as both a grating coupler to redirect light into a waveguide and as a lens element improving the imaging quality of the projector lens.

In the example of FIG. 4, software components 417 operate to provide an overall artificial reality application. In this example, software components 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices such as image capture devices 138, 238 or 338, controller(s) 114, and/or other sensor devices (such as motion sensors 136, 206 or 336), gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110. In some examples, gesture detector 424 may track movement, including changes to position and orientation, of controller(s) 114, hand, digits, and/or arm based on the captured image data, and compare motion vectors of the objects to one or more entries in gesture library 430 to detect a gesture or combination of gestures performed by user 110.

In accordance with the techniques described in this disclosure, HMD 112 may include a memory control unit 305 for dynamically managing memory in mixed mode cache and shared memory systems, as further described in FIGS. 5-11 below.

Figure 5:
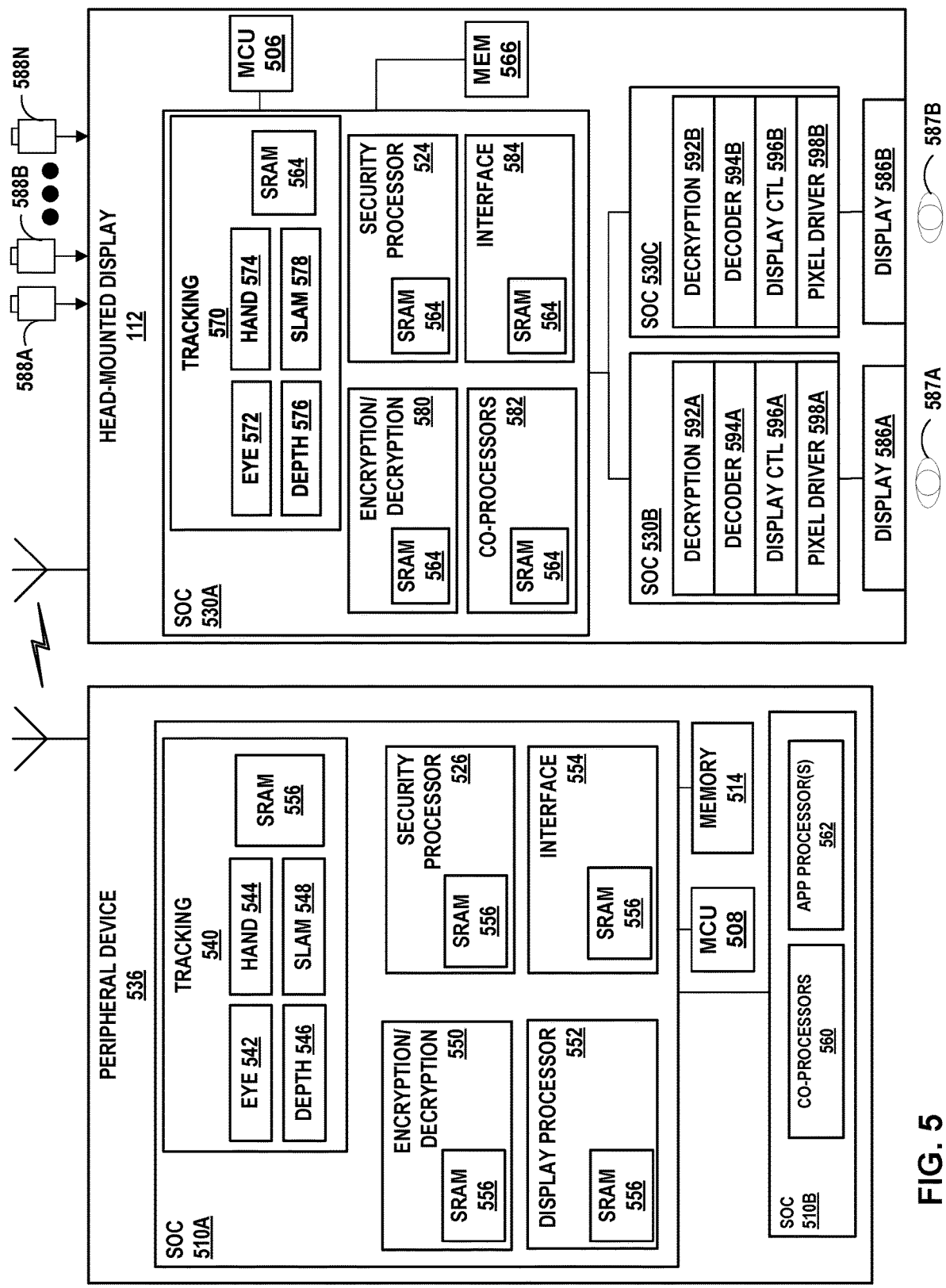
FIG. 5 is a block diagram illustrating an example implementation of a distributed architecture for a multi-device artificial reality system in which one or more devices are implemented using one or more systems-on-a-chip (SoCs) integrated circuits within each device, in accordance with techniques described in this disclosure.

FIG. 5 is a block diagram illustrating an example implementation of a distributed architecture for a multi-device artificial reality system in which one or more devices are implemented using one or more systems-on-a-chip (SoCs) integrated circuits within each device, in accordance with techniques described in this disclosure. FIG. 5 illustrates an example in which HMD 112 operates in conjunction with a peripheral device 536. Peripheral device 536 represents a physical, real-world device having a surface on which multi-device artificial reality systems, such as systems 100, may overlay virtual content. Peripheral device 536 may include an interface 554 having one or more presence-sensitive surface(s) for detecting user inputs by detecting a presence of one or more objects (e.g., fingers, stylus, etc.) touching or hovering over locations of presence-sensitive surfaces. In some examples, peripheral device 536 may have a form factor similar to any of a smartphone, a tablet computer, a personal digital assistant (PDA), or other handheld device. In other examples, peripheral device 536 may have the form factor of a smartwatch, a so-called "smart ring," or other such wearable device. Peripheral device 536 may also be part of a kiosk or other stationary or mobile system. Interface 554 may incorporate output components, such as one or more display device(s), for outputting visual content to a screen. As described above, HMD 112 is architected and configured to enable the execution of artificial reality applications.

In this example, HMD 112 and peripheral device 536 include SoCs 530A and 510A, respectively. SOCs 530A and 510A represent a collection of specialized integrated circuits arranged in a distributed architecture and configured to provide an operating environment for artificial reality applications. As examples, SoC integrated circuits may include a variety of compute elements. The compute elements may include specialized functional blocks operating as co-application processors, sensor aggregators, encryption/decryption engines, security processors, hand/eye/depth tracking and pose computation elements, video encoding and rendering engines, display controllers and communication control components. Some or all of these functional blocks may be implemented as subsystems that include local memory such as SRAM. In one example approach, each SoC (510A, 510B, and 530A-C) in FIG. 5 includes two or more compute elements and memory distributed as local memory among specific compute elements but accessible to each of the other compute elements via a local memory caching mechanism, as detailed below. FIG. 5 is merely one example arrangement of SoC integrated circuits. The distributed architecture for a multi-device artificial reality system may include any collection and/or arrangement of SoC integrated circuits.

In the example of FIG. 5, HMD 112 includes SoCs 530A, 530B and 530C in accordance with the techniques of the present disclosure. SoC 530A includes SRAM 564. SRAM 564 can be separated or external (e.g., not on-die) from the processor(s) and other on-die circuitry of SoC 530A. Peripheral device 536, in this example, is implemented using a traditional SoC architecture, in which SoC 510A includes an on-die SRAM 556 that may be distributed across subsystems of SoC 510A, and external (off-die) non-volatile local memory 514. In contrast, in accordance with the techniques of the present disclosure, SoC 530A does not include an external non-volatile local memory; instead, SRAM 564 has sufficient memory capacity to perform the functions of both traditional on-die SRAM (such as SRAM 556) and external non-volatile local memory (such as NVM 514).

Head-mounted displays, such as HMD 112 as used in AR/VR systems as described herein, can benefit from the reduction in size, increased processing speed and reduced power consumption provided by the SoC/SRAM 530. For example, the benefits provided by the SoC 530 in accordance with the techniques of the present disclosure can result in increased comfort for the wearer and a more fully immersive and realistic AR/VR experience.

In addition, it shall be understood that any of SoCs 510 and/or 530 may be implemented using an SoC/SRAM integrated circuit component in accordance with the techniques of the present disclosure, and that the disclosure is not limited in this respect. Any of the SoCs 510 and/or 530 may benefit from the reduced size, increased processing speed and reduced power consumption provided by SoC/SRAM integrated circuit described herein. In addition, the benefits provided by the SoC/SRAM component in accordance with the techniques of the present disclosure are not only advantageous for AR/VR systems, but may also be advantageous in many applications such as autonomous driving, edge-based artificial intelligence, Internet-of-Things, and other applications which require highly responsive, real-time decision-making capabilities based on analysis of data from a large number of sensor inputs.

In this example, SoC 530A of HMD 112 comprises functional blocks including security processor 524, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). Some or all these functional blocks may be implemented within one or more subsystems of SoC 530A. As an example of the operation of these functional blocks, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 536 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 of SoC 530A is a functional block to encrypt outgoing data communicated to peripheral device 536 or a security server and decrypt incoming data communicated from peripheral device 536 or a security server. Coprocessors 582 include one or more processors for executing instructions, such as a video processing unit, graphics processing unit, digital signal processors, encoders and/or decoders, AR/VR applications and/or others.

Interface 584 of SoC 530A is a functional block that includes one or more interfaces for connecting to functional blocks of SoC 530B and/or 530C. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 536.

SoCs 530B and 530C of HMD 112 each represents display controllers for outputting artificial reality content on respective displays, e.g., displays 586A, 586B (collectively, "displays 586"). In this example, SoC 530B may include a display controller for display 586A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 586B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

In this example, peripheral device 536 includes SoCs 510A and 510B configured to support an artificial reality application. In this example, SoC 510A comprises functional blocks including security processor 226, tracking 540, an encryption/decryption 550, a display processor 552, and an interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). Some or all of these functional blocks may be implemented in various subsystems of SoC 510A. As an example of the operation of SoC 510A, peripheral device 536 may receive input from one or more accelerometers (also referred to as inertial measurement units or "IMUs") that output data indicative of current acceleration of peripheral device 536, GPS sensors that output data indicative of a location of peripheral device 536, radar or sonar that output data indicative of distances of peripheral device 536 from various objects, or other sensors that provide indications of a location or orientation of peripheral device 536 or other objects within a physical environment. Peripheral device 536 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 536 and, in accordance with the current pose, renders the artificial reality content to HMD 112.

Encryption/decryption 550 of SoC 510A encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key). Display processor 552 of SoC 510A includes one or more processors such as a video processing unit, graphics processing unit, encoders and/or decoders, and/or others, for rendering artificial reality content to HMD 112. Interface 554 of SoC 510A includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

SoC 510B of peripheral device 536 includes co-application processors 560 and application processors 562. In this example, co-processors 560 include various processors, such as a vision processing unit (VPU), a graphics processing unit (GPU), and/or central processing unit (CPU). Application processors 562 may execute one or more artificial reality applications to, for instance, generate and render artificial reality content and/or to detect and interpret gestures performed by a user with respect to peripheral device 536.

In accordance with the techniques described in this disclosure, HMD 112 may include a memory control unit (MCU) 506 for dynamically managing memory in mixed mode cache and shared memory systems within HMD 112. MCU 506 may represent a hardware state machine for SoC 530A. In some examples, peripheral device 536 may include a memory control unit 508 for dynamically managing memory in mixed mode cache and shared memory systems within peripheral device 536. MCU 508 may represent a hardware state machine for SoC 510A. Each of memory control units 506, 508 may comprise processing circuitry and is configured to perform one or more aspects of the techniques described in this disclosure. Memory control units 506, 508 may each include instructions that, when executed, control the memory allocation of shared memory. For ease of illustration, the example techniques described below is described with respect to memory control unit 506, but may also be applied to memory control unit 508.

For example, memory control unit 506 may receive a request (e.g., inter-process communication (IPC)) for shared memory from any of compute elements. For example, memory control unit 506 may receive a request from tracking 570 for shared memory. In response to receiving the request from tracking 570, memory control unit 506 may transition on-die SRAM 564 from a cache to shared memory for use by tracking 570. Memory control unit 506 may program a cache controller (not shown in FIG. 5) to flush out the dirty cache lines (e.g., ways) being transitioned to shared memory. In some examples, memory control unit 506 may flush one cache line at a time from the ways being transitioned to shared memory or flush a plurality of cache lines, and updating the cache lines as invalid in the tag RAM. The memory control unit 506 may stop traffic to the cache during the flushing operation.

After flushing the ways transitioned to shared memory, memory control unit 506 may send an indication to tracking 570 that the shared memory is available for use. In some examples, any compute element that requests for access to shared memory may be denied access to the shared memory unless it receives the indication that the shared memory is available. In some examples, a firewall may prevent access to the shared memory to provide additional control to portions of the shared memory.

Memory control unit 506 may leverage the cache flushing mechanisms to track data in the shared memory to memory, e.g., memory 566. For example, memory control unit 506 may use tag control bits stored in a tag RAM (not shown in FIG. 5) to track valid/invalid and clean/dirty cache lines of the shared memory. For instance, memory control unit 506 may update the tag control bits within the tag RAM (e.g., set the dirty bit) on each write access to the shared memory. In this way, when transitioning the shared memory to another hardware unit and back to a cache, only data within cache lines with the dirty bit set is flushed from the shared memory instead of writing the entire contents of the shared memory into memory 566. In some examples, memory control unit 506 may select one or more ways that are scheduled for transitioning to shared memory to not be evicted. In these examples, the contents in the SMEM are temporal and do not need to be preserved (i.e., written to backend store).

Memory control unit 506 may determine the location within the backend store of memory 566 to store the data in the shared memory. As one example (and as further described in FIG. 8 below), memory control unit 506 may generate an address lookup table including a mapping of virtual memory addresses of the shared memory to physical memory addresses of the backend storage in memory 566. In some examples, the address lookup table is programmed when the page address table is programmed. When evicting the shared memory, the memory control unit 506 may use the physical memory address of the shared memory that is pinned to on-die SRAM 564 to determine a virtual memory address of the shared memory by performing a reverse lookup of the address lookup table to determine a physical memory address of the backend storage in memory 566 to store the data from the shared memory.

In another example (and as further described in FIG. 9 below), memory control unit 506 may store the virtual memory address of the shared memory in tag RAM. When evicting the shared memory, the memory control unit may perform a lookup of the tag RAM to determine the virtual memory address of the shared memory, which is used to determine an offset in the backend storage of memory 566. The offset in the backend storage is then added to a base address of the backend storage to determine the actual physical memory address within memory 566.

Figure 6:
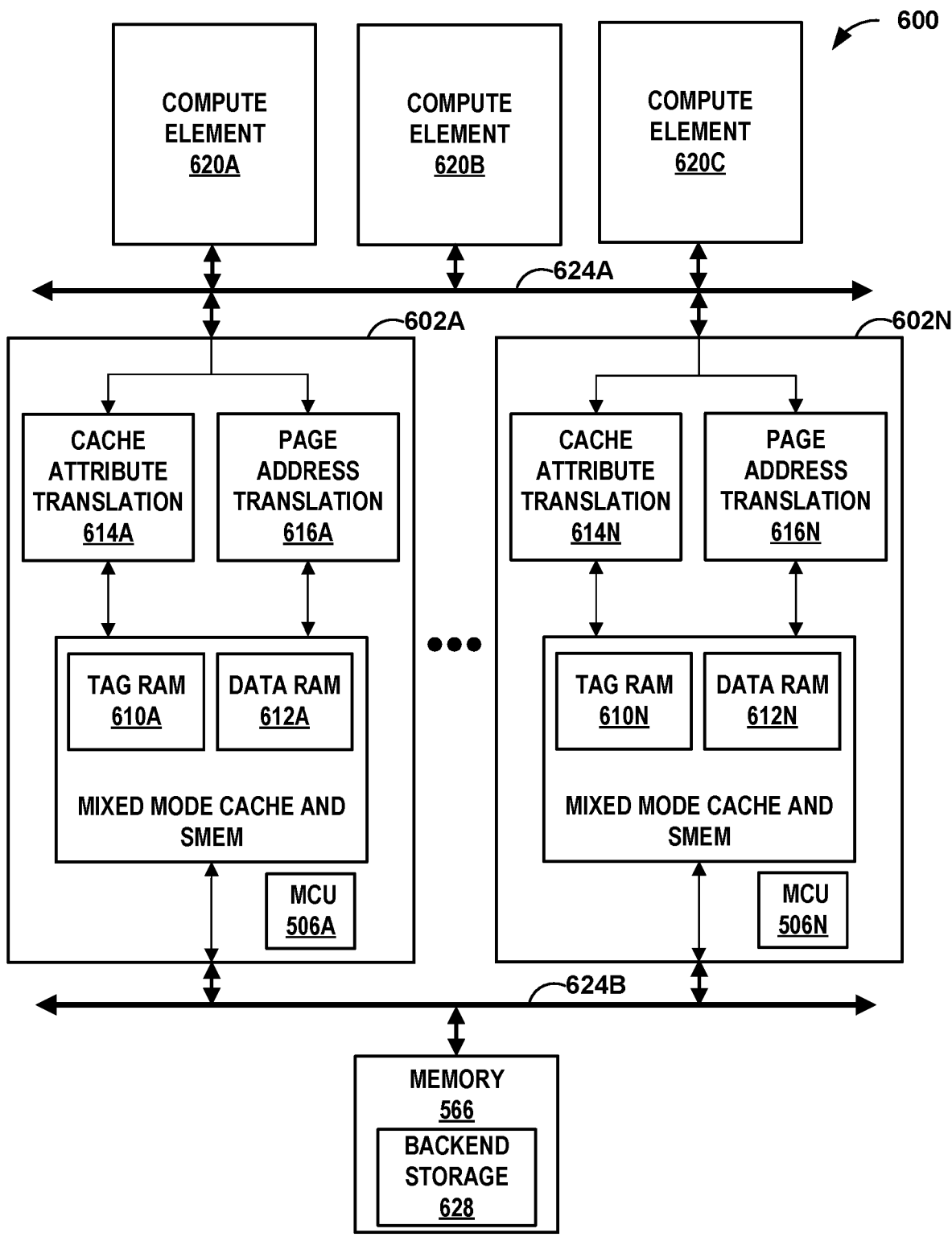
FIG. 6 is a block diagram illustrating an example a mixed mode cache and shared memory system, in accordance with techniques described in this disclosure.

FIG. 6 is a block diagram illustrating an example of a mixed mode cache and shared memory system, in accordance with techniques described in this disclosure. The example shown in FIG. 6 illustrates a mixed mode cache and shared memory system 600 of a System-on-a-Chip (SoC) including one or more subsystems with compute elements, e.g., compute elements 620A-620C (collectively, "compute elements 620"), that communicate with one or more instances of mixed mode cache and shared memory elements 602A-602N (collectively, "memory elements 602") via an upstream Network-on-a-Chip (NOC) 624A that is a network-based communications system that implements a router-based packet switching network on-die between compute elements 620. Each instance of memory elements 602 communicate with an off-chip memory, e.g., memory 566 that may be allocated with backend storage 628 for the mixed mode cache and shared memory system via a downstream NOC 624B.

In this example, the on-die SRAM may be reconfigured from shared memory to a cache (and vice-versa), or may switch its association with one compute element to another compute element of the SoC. When an on-die SRAM is reconfigured from a shared memory to a cache, or when the shared memory switches its association with one compute element to another compute element of an SoC, data in the shared memory needs to be flushed to backend storage 628.

In this example, each instance of memory elements 602 includes a cache attribution translation table 614, page address translation table 616, tag RAM 610, and data RAM 612, respectively. Data RAM 612 stores data of the shared memory in one or more "ways" (e.g., cache lines) of the cache that have been transitioned from the cache to the shared memory. Tag RAM 610 may be used to keep track of clean and dirty locations in shared memory that have been modified. For example, tag RAM 610 may store tag control bits (e.g., clean and dirty bits) to track valid/invalid and clean/dirty cache lines allocated for the shared memory. For example, when the shared memory allocated in data RAM 612 gets updated, corresponding dirty tag bits are updated within tag RAM 610. When flushing data from the shared memory, the dirty tag bits in tag RAM 610 are used in deciding what needs to be copied back to backend storage 628 instead of writing the entire contents of the shared memory into backend storage 628.

In some examples, the shared memory address space is virtualized. For example, the virtual memory address space for the shared memory is split into pages, with each page pinned to physical memory, e.g., on-die SRAM or backend storage 628. In these examples, tag RAM 610 stores the virtual memory addresses of the shared memory. In these examples, when evicting the shared memory, the memory control unit (e.g., memory control unit 506) may perform a lookup of tag RAM 610 to determine the virtual memory address of the shared memory, which is used to determine the offset in backend storage 628. The offset is then added to a base address of the backend storage 628 to determine the actual physical memory address in memory 566 to which the data in the shared memory is to be stored.

Page address translation table 616 may include a mapping of physical memory addresses (on-die SRAM or off-chip memory such as memory 566) to virtual memory addresses of the shared memory that match the offset in backend storage 628. When evicting the shared memory, the memory control unit may use the physical memory address of the shared memory that is pinned to the on-die SRAM to determine a virtual memory address of the shared memory, which in turn is used to perform a reverse lookup of page address translation table 616 to determine a physical memory address of the backend store 628 for which to store data from the shared memory.

The cache attribute translation table 614 stores attributes of the cache (e.g., cacheable, noncacheable, bufferable only, etc.). Memory 566 may represent a random access memory (RAM), such as double data rate (DDR) Synchronous Dynamic Access Memory (SDRAM), or simply "DDR," or other off-chip memory.

In some examples, an instance of memory element 602 may alternatively be colocated in one of compute elements 620. In some examples, memory element 602A may represent a tracking compute element that may require lower latency communication for better performance. In these examples, memory element 602A may colocate with compute element 620A to provide lower latency communication. In other examples, each instance of memory elements 602 may operate concurrently to provide additional bandwidth for the mixed mode cache and shared memory system.

The mixed mode cache and shared memory system 600 is merely one example. The architecture for the mixed mode cache and shared memory system 600 may include any collection and/or arrangement of elements to provide the configuration and management of a mixed mode cache and shared memory system. For example, mixed mode cache and shared memory system 600 may include a plurality of backend storage, each with a page address translation table associated with the backend storage. In this example, mixed mode cache and shared memory system 600 may include a page address translation table selector (not shown) to select which instance of the page address translation table to perform the lookup.

Alternatively, or additionally, the mixed mode cache and shared memory element 602 may include a mechanism to zero out the data stored in the shared memory after a flush or eviction of the shared memory. In this way, another compute element with unauthorized access to the data in the shared memory is not able to access the data.

In some examples, the mixed mode cache and shared memory element 602 may also include a firewall to control access by the one or more compute elements 620 to the shared memory. In this example, the firewall may provide access for select compute elements. For example, compute element 620A may have a first identifier and compute element 620B may have a second identifier. In this example, the firewall may have a policy to grant access only to compute element 620B. When the firewall receives a request to access the shared memory from compute element 620A, the firewall may determine, based on an identifier included in the request, whether compute element 620A is permitted to access the shared memory. Because the firewall policy does not allow access from compute element 620A, the firewall may deny the request to access the shared memory from compute element 620A.

In some examples, the allocation of ways for the shared memory may result in non-contiguous memory. In these examples, the mixed mode cache and shared memory system 600 may autogenerate the virtual addresses such that the addresses for the shared memory appear to be contiguous.

Figure 7:
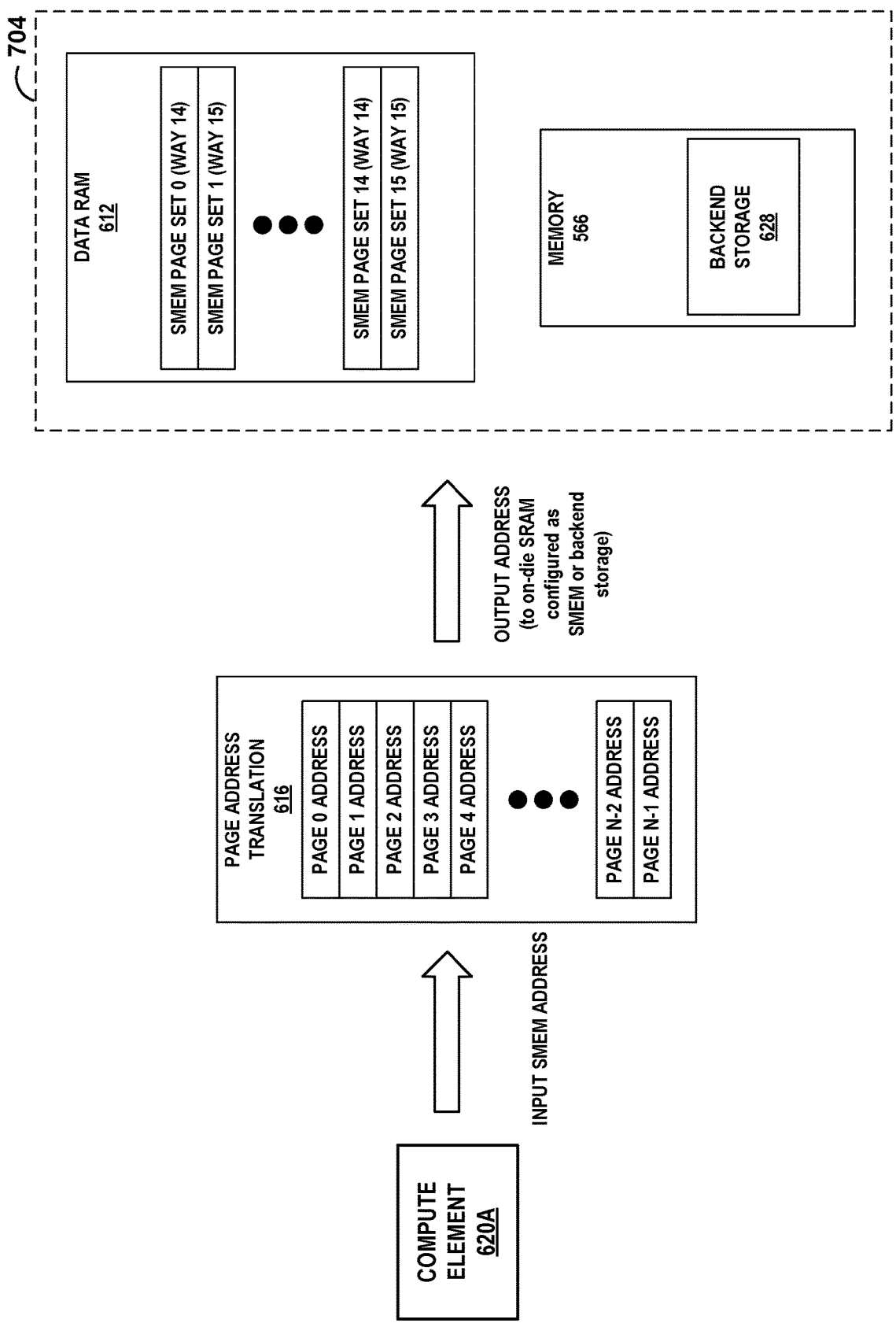
FIG. 7 is a conceptual diagram illustrating an example of pinning a portion of a virtual memory address space to shared memory, in accordance with the techniques described in this disclosure.

FIG. 7 is a conceptual diagram illustrating an example of pinning a portion of a virtual memory address space to shared memory, in accordance with the techniques described in this disclosure. For ease of illustration, FIG. 7 is described with respect to HMD 112 and memory control unit 506 of FIG. 5, but may be applicable to any device having an SoC including one or more compute elements with on-die SRAM configurable as a cache or shared memory.

A virtual memory address space for an application is mapped to physical memory address space in memory 566, e.g., backend storage 628. A portion of the virtual memory address space may be pinned to on-die SRAM (e.g., SRAM 564A and 564B of FIG. 5) as shared memory 704 for the application. To configure on-die SRAM as shared memory 704, a memory control unit 506 may remove one or more ways of on-die SRAM used as a set-associative cache. In this example, way 14 and way 15 are removed from the 16-way set-associative cache and allocated for shared memory 704. The virtual memory address space for way 14 and way 15 can now act as physical on-die shared memory. Portions of the virtual address space from the backend storage 628 of memory 566 may be mapped to this physical shared memory and the virtual memory address for the shared memory may be stored in tag RAM 610.

The virtual memory address space for shared memory 704 may be split into pages, e.g., page 0 to page N−1 in this example. Each of the pages is pinned either to on-die SRAM (e.g., ways 14 and 15) or in memory 566. When a compute element, e.g., compute element 620A, requests for access to shared memory 704, the system cache controller 606 may use the virtual memory address from the request to perform a lookup of a page address translation table 616 to translate the virtual memory address of the shared memory to a physical memory address (e.g., either to on-die SRAM configured as shared memory 704 or to memory 566).

In this example, memory control unit 506 may use the attributes for way 14 and way 15 to manage flushing of shared memory 704. For example, memory control unit 506 may use tag control bits stored in tag RAM 610 to track valid/invalid and clean/dirty cache lines of way 14 and way 15. For instance, memory control unit 506 may update the tag control bits within the tag RAM 610 (e.g., set the dirty bit) on each write access to way 14 or way 15 where data has not been propagated to memory 566. In this manner, instead of copying the entire data section of the shared memory to the memory 566, only if way 14 or way 15 set with a dirty bit is copied to memory 566 on a flush of the shared memory (e.g., due to a transition from shared memory to cache or switching the association of the shared memory to another compute element or different workload). Memory control unit 506 may use the physical memory address associated with way 14 or way 15 to index into the shared memory.

Figure 8:
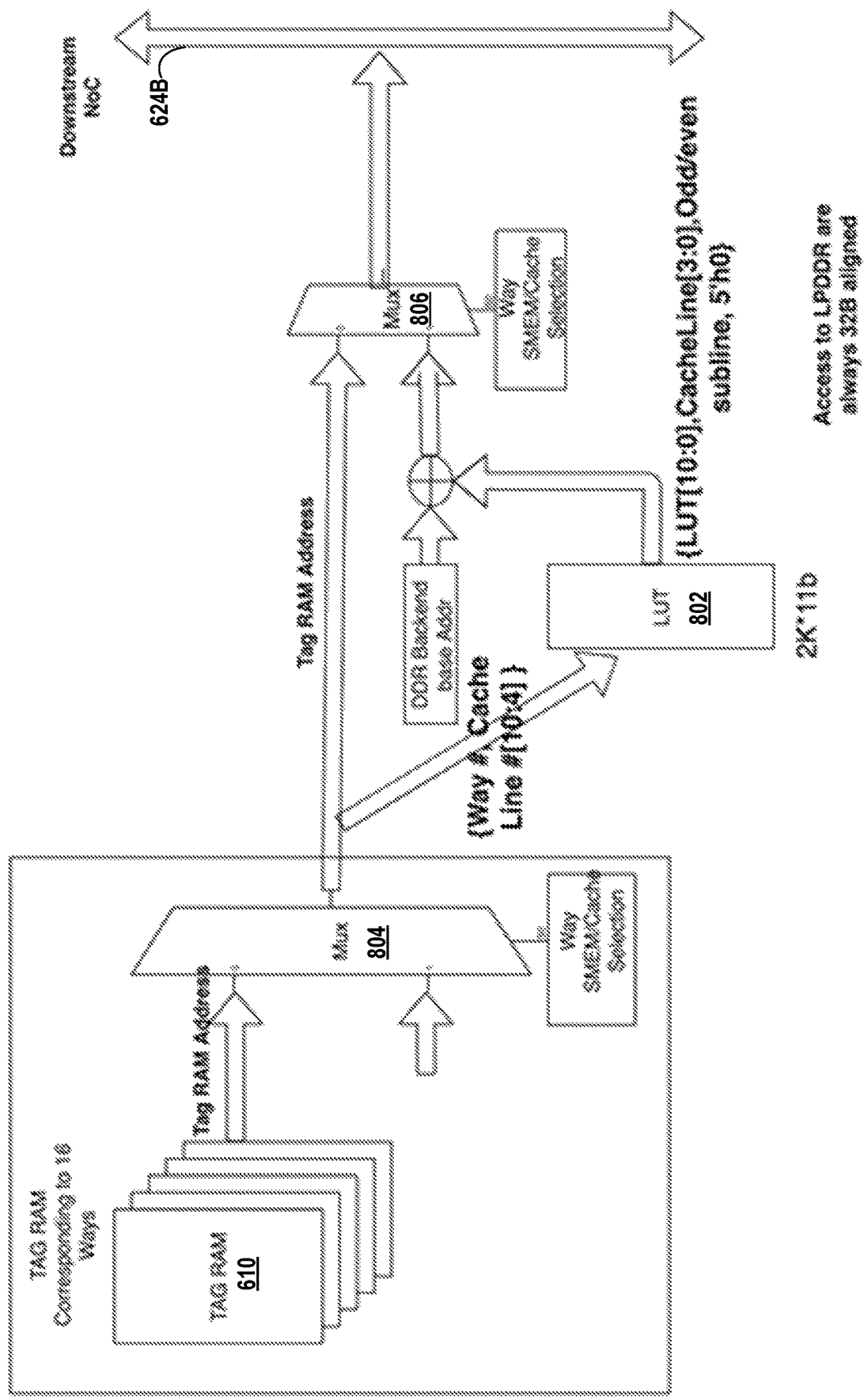
FIG. 8 is a block diagram illustrating an example of managing a mixed mode cache and shared memory system, in accordance with techniques described in this disclosure.

FIG. 8 is a block diagram illustrating an example operation of managing a shared memory, in accordance with the techniques described in this disclosure. In this example, cache controller may apportion region 0 to region 3 for the shared memory (e.g., by removing ways of the set-associative cache). In the example of FIG. 8, the memory control unit 506 may generate an address lookup table, e.g., LUT 802, including a mapping of virtual memory addresses and physical memory addresses of the shared memory (e.g., shared memory 704 of FIG. 7). LUT 802 may represent an example of any of page address translation tables 616 of FIG. 6.

When evicting a shared memory 704, the memory control unit 506 may determine the physical memory address to which data from the shared memory is to be stored. As described above, tag RAM 610 stores the physical memory addresses of on-die SRAM (e.g., used as a cache and/or as shared memory). In this example, memory control unit 506 may determine, from the tag RAM 610, the physical memory address of on-die SRAM having data to be propagated to memory 566.

In the example approach shown in FIG. 8, multiplexers 804, 806 multiplex the memory addresses in order to present to SRAM the appropriate address to which data from the shared memory is to be stored. In one example approach, multiplexers 804, 806 select between the addresses based on the particular way (e.g., allocated either for cache or shared memory).

The physical memory address of on-die SRAM 564A is used as an index to a particular way and cache line number used to access the shared memory. Using the particular way and cache line number, the memory control unit 506 may perform a lookup of the address lookup table 802 to determine the virtual memory address of the shared memory, which is mapped to a physical memory address in backend storage 628.

Figure 9:
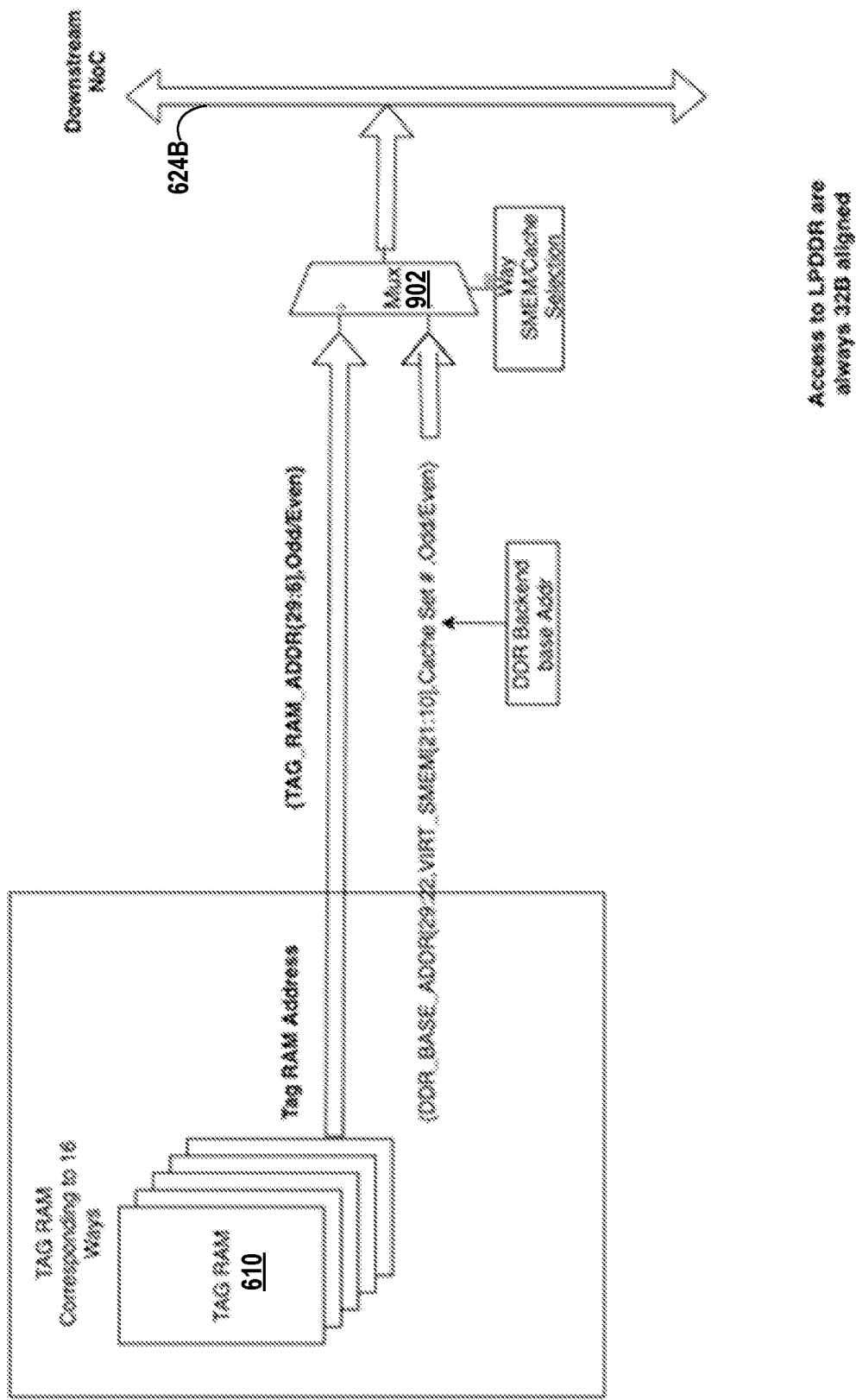
FIG. 9 is a flowchart illustrating another example of managing shared memory in mixed mode cache and shared memory systems in accordance with techniques described in this disclosure.

FIG. 9 is a block diagram illustrating another example operation of managing a shared memory, in accordance with the techniques described in this disclosure. For ease of illustration, FIG. 9 is described with respect to SoC 600 of FIG. 6, but may represent any SoC including one or more compute elements with on-die SRAM configured as a mixed mode cache and shared memory system.

In the example of FIG. 9, memory control unit 506 may store virtual memory addresses of the shared memory in tag RAM 610. In this example, microcontroller unit 506 may determine, from the tag RAM 610 and based on the stored virtual memory addresses, the physical memory addresses to which data stored in shared memory is to be propagated to memory 566.

When evicting a shared memory (e.g., shared memory 704 of FIG. 7), the memory control unit 506 may perform a lookup of tag RAM 610 to determine the virtual memory address of the shared memory (e.g., "VIRT_SMEM [21:10]"). Memory control unit 506 may use the virtual memory address to determine the offset in the backend storage. The offset is added to the base address of the backend storage 628 (e.g., "DDR_BASE_ADDR[29:22]") to determine the actual address within memory 566 to store the data in the shared memory.

In the example approach shown in FIG. 9, multiplexer 902 multiplexes the memory addresses in order to present to SRAM the appropriate address to which data from the shared memory is to be stored. In one example approach, multiplexer 902 selects between the addresses based on the particular way (e.g., allocated either for cache or shared memory).

Figure 10:
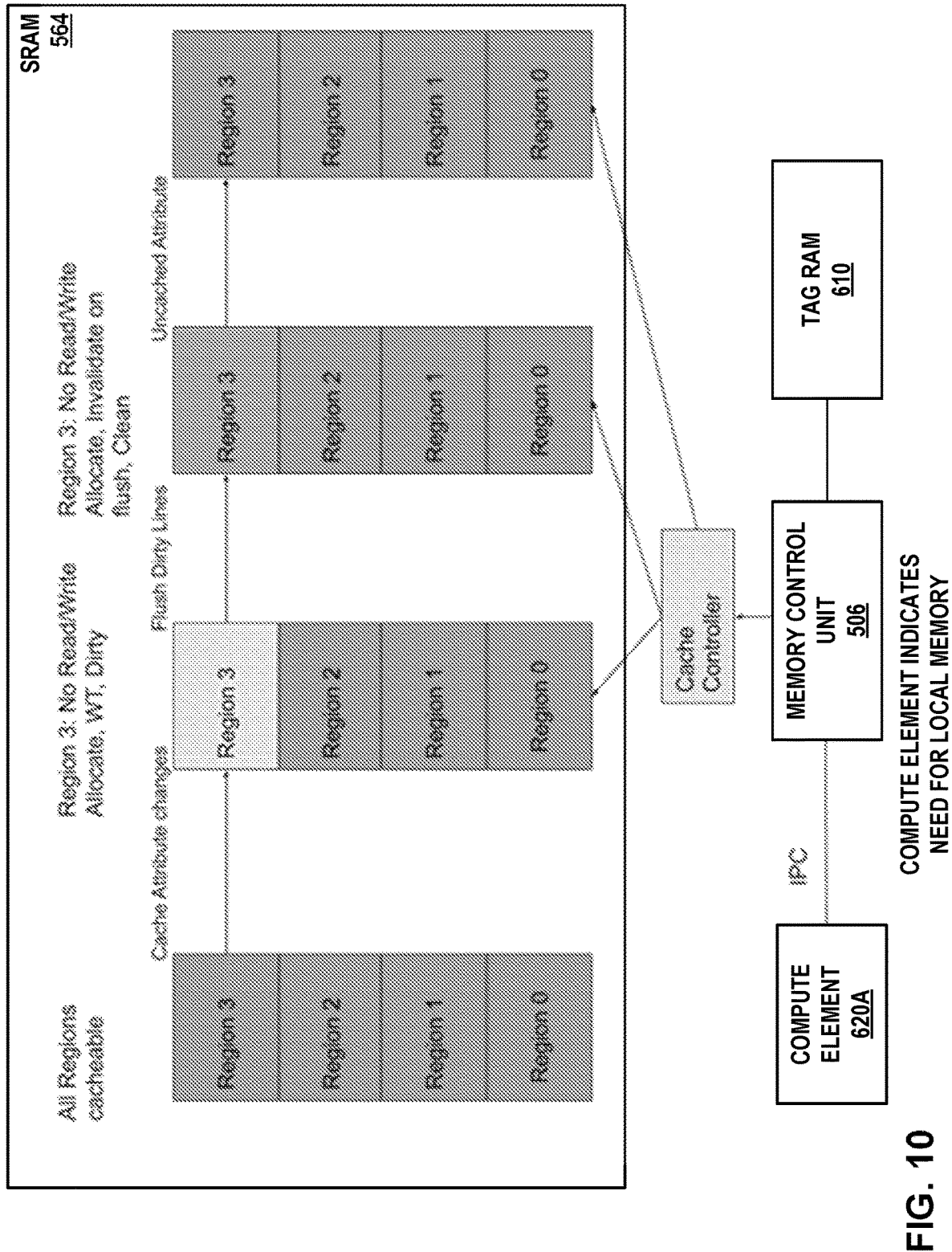
FIG. 10 is a block diagram illustrating an example of managing cache lines of a shared memory, in accordance with the techniques described in this disclosure.

FIG. 10 is a block diagram illustrating an example of managing cache lines of a shared memory, in accordance with the techniques described in this disclosure. In this example, memory control unit 506 may receive a request (e.g., IPC) for shared memory. Memory control unit 506 may instruct the cache controller to allocate a portion of the memory to on-die SRAM 564, e.g., region 0 to region 3.

On a write access to region 3 of the shared memory (e.g., "cache attribute changes"), memory control unit 506 may update the tag control bits within tag RAM 610. When flushing the shared memory, memory control unit 506 may determine the regions within the shared memory with a dirty bit set and flush the regions with the dirty bit set. In this example, region 3 is set with a dirty bit and is flushed and invalidated.

Figure 11:
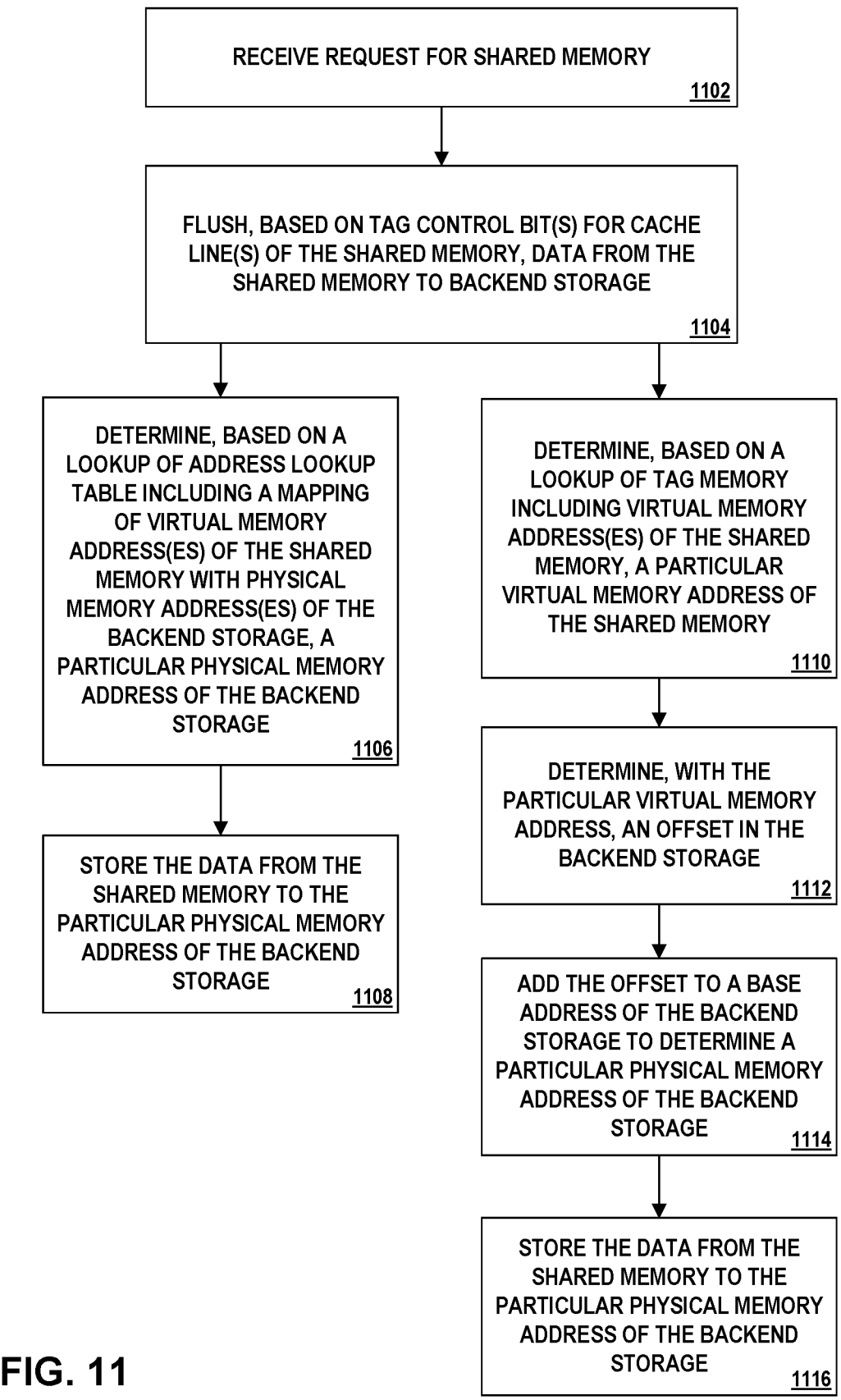
FIG. 11 is a flowchart illustrating example operations of a method for managing shared memory, in accordance with techniques described in this disclosure.

FIG. 11 is a flowchart illustrating example operations of a method for managing shared memory, in accordance with techniques described in this disclosure. In the example of FIG. 11, memory control unit 506 may receive a request for shared memory (1102). For example, memory control unit 506 may receive an inter-process communication from any of compute elements for shared memory. To transition a portion of a set-associative cache to a shared memory, one or more cache lines (e.g., ways) are removed from the set-associative cache and allocated for the shared memory. The virtual memory address space for the ways transitioning to shared memory may be mapped to a physical memory address space within the backend storage (e.g., backend storage 628 of memory 566) and the virtual memory address for the shared memory may be stored in tag RAM (e.g., tag RAM 610).

Once the data is flushed from the ways of the cache, the memory control unit may leverage the tag control bits stored in a tag RAM to manage the shared memory. For example, memory control unit 506 may use valid/invalid bits and clean/dirty bits to keep track of data in the shared memory when flushing data into the backend storage (1104). For example, if data within the cache lines of the shared memory is modified and has not been propagated to memory, memory control unit 506 may set a dirty bit for the cache lines within the tag RAM. In this manner, when flushing the shared memory (e.g., due to transition from SMEM to cache or switching association of SMEM to another compute element), the memory control unit may propagate only the data in cache lines of the shared memory with a valid bit and dirty bit set to the backend storage (e.g., DDR).

As one example, the memory control unit 506 may generate an address lookup table including a mapping of virtual memory addresses of the shared memory to physical memory addresses of the backend storage in memory. Memory control unit 506 may determine, based on a lookup of the address lookup table, a particular physical memory address of the backend storage to store the data in the shared memory (1106). For example, when flushing the shared memory, the memory control unit 506 may use the physical memory address of the shared memory that is pinned to the on-die SRAM to determine a virtual memory address of the shared memory, which in turn is used to perform a reverse lookup of the address lookup table to determine a physical memory address of the backend store for which to store data from the shared memory. The physical memory address is then used to store the data from the shared memory (1108).

In another example, the memory control unit 506 may store the virtual memory addresses of the shared memory in the tag RAM. When flushing the shared memory, the memory control unit 506 may determine, based on a lookup of the tag RAM, a particular virtual memory address of the shared memory (1110), which is used to determine an offset in the backend storage (1112). The offset of the backend storage is then added to a base address of the backend storage to determine the physical memory address in the memory to store the data in the shared memory (1114). The physical memory address is then used to store the data from the shared memory (1116).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

For ease of illustration, only a limited number of devices (e.g., shared memory devices, SoC devices, subsystems, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

What is claimed is:

1. A system on a chip (SoC) comprising:
a plurality of memories, including a first memory and a second memory, where each of the memories includes one or more cache lines;
a first subsystem comprising a first compute element and the first memory;
a second subsystem comprising a second compute element and the second memory; and
a memory control unit of the SoC comprising processing circuitry and configured to:
configure a shared memory with one or more cache lines of at least one of the plurality of memories; and
flush, based on one or more tag control bits for the one or more cache lines of the shared memory, data from the shared memory to a backend storage separate from the SoC.

2. The SoC of claim 1, wherein the tag control bits are stored in a tag memory.

3. The SoC of claim 2, wherein to flush data from the shared memory to the backend storage, the memory control unit is further configured to determine, from a lookup of the tag memory, the one or more cache lines of the shared memory set with a dirty bit.

4. The SoC of claim 1, wherein the backend storage comprises a Double Data Rate (DDR) random access memory (RAM).

5. The SoC of claim 1,
wherein the memory control unit is further configured to generate an address lookup table comprising a mapping of virtual memory addresses of the shared memory with physical memory addresses of the backend storage,
wherein to flush data from the shared memory to the backend storage, the memory control unit is further configured to determine, based on a lookup of the address lookup table, a particular physical memory address of the physical memory addresses of the backend storage corresponding to a particular virtual memory address of the virtual memory addresses of the shared memory to store the data from the shared memory.

6. The SoC of claim 5, wherein to determine the particular physical memory address of the backend storage corresponding to the particular virtual memory address of the shared memory, the memory control unit is further configured to:
determine, based on a lookup of the address lookup table, an offset of the particular physical memory address of the backend storage matches an offset of the particular virtual memory address of the shared memory.

7. The SoC of claim 5,
wherein the physical memory addresses of the backend storage are each used to index a particular way and cache line number of the one or more cache lines of the shared memory.

8. The SoC of claim 1,
wherein the memory control unit is further configured to store virtual memory addresses of the shared memory in a tag memory,
wherein to flush data from the shared memory to the backend storage, the memory control unit is further configured to:
determine, based on a lookup of the tag memory, a particular virtual memory address of the virtual memory addresses of the shared memory;
determine, with the particular virtual memory address determined from the tag memory, an offset in the backend storage; and
add the offset to a base address of the backend storage to determine a particular physical memory address of the physical memory addresses of the backend storage to store the data from the shared memory.

9. An artificial reality system comprising:
a head mounted display (HMD) configured to output artificial reality content, the HMD including a system on a chip (SoC), wherein the SoC comprises:
a plurality of memories, including a first memory and a second memory, where each of the memories includes one or more cache lines;
a first subsystem comprising a first compute element and the first memory;
a second subsystem comprising a second compute element and the second memory; and
a memory control unit of the SoC comprising processing circuitry and configured to:
configure a shared memory with one or more cache lines of at least one of the plurality of memories; and
flush, based on one or more tag control bits for the one or more cache lines of the shared memory, data from the shared memory to a backend storage separate from the SoC.

10. The artificial reality system of claim 9, wherein the tag control bits are stored in a tag memory.

11. The artificial reality system of claim 9, wherein to flush data from the shared memory to the backend storage, the memory control unit is further configured to determine, from a lookup of the tag memory, the one or more cache lines of the shared memory set with a dirty bit.

12. The artificial reality system of claim 9, wherein the backend storage comprises a Double Data Rate (DDR) random access memory (RAM).

13. The artificial reality system of claim 9,
wherein the memory control unit is further configured to generate an address lookup table comprising a mapping of virtual memory addresses of the shared memory with physical memory addresses of the backend storage, and
wherein to flush data from the shared memory to the backend storage, the memory control unit is further configured to determine, based on a lookup of the address lookup table, a particular physical memory address of the physical memory addresses of the backend storage corresponding to a particular virtual memory address of the virtual memory addresses of the shared memory to store the data from the shared memory.

14. The artificial reality system of claim 13, wherein to determine the particular physical memory address of the backend storage corresponding to the particular virtual memory address of the shared memory, the memory control unit is further configured to:
- determine, based on a lookup of the address lookup table, an offset of the particular physical memory address of the backend storage matches an offset of the particular virtual memory address of the shared memory.

15. The artificial reality system of claim 13,
wherein the physical memory addresses of the backend storage are each used to index a particular way and cache line number of the one or more cache lines of the shared memory.

16. The artificial reality system of claim 9,
wherein the memory control unit is further configured to store virtual memory addresses of the shared memory in a tag memory,
wherein to flush data from the shared memory to the backend storage, the memory control unit is further configured to:
- determine, based on a lookup of the tag memory, a particular virtual memory address of the virtual memory addresses of the shared memory;
- determine, with the particular virtual memory address determined from the tag memory, an offset in the backend storage; and
- add the offset to a base address of the backend storage to determine a particular physical memory address of the physical memory addresses of the backend store to store the data from the shared memory.

17. A method comprising:
- configuring a shared memory with one or more cache lines of at least one of a plurality of memories of a system on a chip (SoC), the plurality of memories including a first memory of a first subsystem and a second memory of a second subsystem; and
- flushing, based on one or more tag control bits for the one or more cache lines of the shared memory, data from the shared memory to a backend storage separate from the SoC.

18. The method of claim 17, further comprising:
- generating an address lookup table comprising a mapping of virtual memory addresses of the shared memory with physical memory addresses of the backend storage,
- wherein flushing data from the shared memory to the backend storage, the memory control unit comprises determining, based on a lookup of the address lookup table, a particular physical memory address of the physical memory addresses of the backend storage corresponding to a particular virtual memory address of the virtual memory addresses of the shared memory to store the data from the shared memory.

19. The method of claim 18, wherein determining the physical memory address space of the backend storage corresponding to the virtual memory address space of the shared memory comprises determining, based on a lookup of the address lookup table, an offset of the particular physical memory address of the backend storage matches an offset of the particular virtual memory address of the shared memory.

20. The method of claim 17, further comprising:
- storing virtual memory addresses of the shared memory in a tag memory,
- wherein flushing data from the shared memory to the backend storage comprises:
  - determining, based on a lookup of the tag memory, a particular virtual memory address of the virtual memory addresses of the shared memory;
  - determining, with the particular virtual memory address determined from the tag memory, an offset in the backend storage; and
  - adding the offset to a base address of the backend storage to determine a particular physical memory address of the physical memory addresses of the backend store to store the data from the shared memory.

* * * * *